United States Patent
Song

(10) Patent No.: US 10,668,889 B2
(45) Date of Patent: Jun. 2, 2020

(54) METHOD FOR FOLDING DRIVER AIRBAG

(71) Applicant: HYUNDAI MOBIS CO., LTD., Seoul (KR)

(72) Inventor: June Young Song, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 339 days.

(21) Appl. No.: 15/894,290

(22) Filed: Feb. 12, 2018

(65) Prior Publication Data

US 2018/0229685 A1  Aug. 16, 2018

(30) Foreign Application Priority Data

Feb. 14, 2017 (KR) ........................ 10-2017-0019949

(51) Int. Cl.
*B60R 21/23* (2006.01)
*B60R 21/237* (2006.01)

(52) U.S. Cl.
CPC .... *B60R 21/237* (2013.01); *B60R 2021/2375* (2013.01)

(58) Field of Classification Search
CPC ...... B60R 21/23; B60R 21/235; B60R 21/237
USPC .......................... 493/405, 407, 243, 251, 259
See application file for complete search history.

(56) References Cited

U.S. PATENT DOCUMENTS

| | | | | |
|---|---|---|---|---|
| 5,493,846 A * | 2/1996 | Baker | ................... | B60R 21/237 280/743.1 |
| 5,782,737 A * | 7/1998 | Warner | ................. | B60R 21/237 493/314 |
| 5,960,611 A * | 10/1999 | Aigner | .................. | B60R 21/237 493/405 |
| 6,171,228 B1 * | 1/2001 | Marotzke | .............. | B60R 21/237 280/728.1 |
| 6,260,330 B1 * | 7/2001 | Borowski | ............. | B60R 21/237 53/429 |
| 6,341,800 B1 * | 1/2002 | Pausch | .................. | B60R 21/237 280/728.1 |
| 6,560,832 B2 * | 5/2003 | Keshavaraj | ........... | B60R 21/231 28/143 |
| 8,540,276 B2 * | 9/2013 | Schneider | ............. | B60R 21/206 280/730.1 |
| 8,678,430 B2 * | 3/2014 | Motomochi | .......... | B60R 21/237 280/732 |
| 8,696,536 B2 * | 4/2014 | Ko | ........................ | B60R 21/237 493/405 |
| 10,106,122 B2 * | 10/2018 | Komatsu | ............... | B60R 21/237 |
| 2001/0036892 A1 * | 11/2001 | Kleeberger | ........... | B60R 21/201 493/405 |

(Continued)

*Primary Examiner* — Gloria R Weeks
(74) *Attorney, Agent, or Firm* — Knobbe Martens Olson & Bear LLP

(57) ABSTRACT

A method for folding a driver airbag may include: forming a tuck-in folding part by pushing an upper end portion of an airbag cushion part into the airbag cushion part; folding the tuck-in folding part toward the opposite side with respect to a driver seat; temporarily attaching the tuck-in folding part to the airbag cushion part; injecting gas into the airbag cushion part, and compressing the airbag cushion part such that the airbag cushion part maintains a plate shape; and folding the airbag cushion part while moving a folding jig disposed in a radial shape around the circumference of the airbag cushion part toward an inflator connection part.

10 Claims, 19 Drawing Sheets

(56) References Cited

U.S. PATENT DOCUMENTS

| | | | |
|---|---|---|---|
| 2006/0220359 A1* | 10/2006 | Sato | B60R 21/23138 280/730.2 |
| 2010/0090446 A1* | 4/2010 | Choi | B60R 21/2035 280/728.2 |
| 2016/0023627 A1* | 1/2016 | Kwon | B60R 21/237 493/405 |
| 2016/0200287 A1* | 7/2016 | Mazanek | B60R 21/36 180/274 |

* cited by examiner

METHOD FOR FOLDING DRIVER AIRBAG

CROSS-REFERENCES TO RELATED APPLICATIONS

The present application claims priority to Korean application number 10-2017-0019949, filed on Feb. 14, 2017, which is incorporated by reference in its entirety.

BACKGROUND OF THE INVENTION

The present invention relates to a method for folding a driver airbag, and more particularly, to a method for folding a driver airbag, which can prevent an upper end portion of an air bag cushion part from being stuck between the neck and jaw of a driver, when the airbag cushion part is deployed.

In general, a vehicle carries passengers. The steering wheel of the vehicle has a driver airbag installed therein, for a driver's safety. The driver airbag is deployed to protect the chest and head of the driver, in case of a collision of the vehicle.

The driver airbag has an inflator connection formed at the opposite side with respect to the driver seat, such that an inflator can be connected to the inflator connection. The inflator connection has a plurality of vent holes formed at the top thereof. The upper portion of an airbag cushion is folded toward the driver and temporarily attached, and the airbag cushion is folded through a folding jig. The folded airbag cushion is packaged in a housing, and then installed in the steering wheel.

In the related art, the upper portion of the airbag cushion is folded toward the driver. Therefore, when the airbag cushion is deployed, the folded portion of the airbag cushion is expanded and stuck between the neck and jaw of the driver. At this time, the folded part of the airbag cushion is expanded and turned upward. Therefore, while the neck and jaw of the driver is pressurized upward, the neck of the driver may be injured.

Furthermore, the inflator may exhibit variability in quality depending on a manufacturing process, and have variability in energy generation (injection pressure of gas) due to the surrounding environment during operation. When the airbag cushion is stuck between the neck and jaw of the driver as in the related art, a vortex of gas flow may be formed in the space between the neck and jaw, thereby significantly increasing a bending load for the neck. Therefore, since an injury of the neck by the bending load for the neck becomes significantly sensitive to the variability in energy generated by the inflator, the quality of the driver airbag may be degraded.

In the related art, first and second tether connections are formed on one surface of the airbag cushion, and first and second tethers are connected to the first and second tether connections. Therefore, a separate member may not be added between the airbag cushion and the first and second tethers.

Furthermore, a sewed portion does not need to be formed on a surface which is in contact with a driver when the airbag cushion is deployed, which makes it possible to prevent the driver's injury caused by friction between the airbag cushion and the driver. Moreover, since the number of sewed portions and the number of parts can be reduced, the operation process can be simplified, and the weight and cost can be reduced.

SUMMARY OF THE INVENTION

Embodiments of the present invention are directed to a method for folding a driver airbag, which can prevent an upper end portion of an air bag cushion part from being stuck between the neck and jaw of a driver, when the airbag cushion part is deployed.

In one embodiment, a method for folding a driver airbag may include: forming a tuck-in folding part by pushing an upper end portion of an airbag cushion part into the airbag cushion part; folding the tuck-in folding part toward the opposite side with respect to a driver seat; temporarily attaching the tuck-in folding part to the airbag cushion part; injecting gas into the airbag cushion part, and compressing the airbag cushion part such that the airbag cushion part maintains a plate shape; and folding the airbag cushion part while moving a folding jig disposed in a radial shape around the circumference of the airbag cushion part toward an inflator connection part.

In the forming of the tuck-in folding part, the upper end portion of the airbag cushion part may be positioned on a virtual line connecting a plurality of vent holes.

In the folding of the tuck-in folding part toward the opposite side with respect to the driver seat, an end portion of the folded tuck-in folding part may be separated from the inflator connection part.

The temporarily attaching of the tuck-in folding part to the airbag cushion part may include forming a temporarily sewed part by sewing the tuck-in folding part to the airbag cushion part.

The injecting of the gas into the airbag cushion part and the compressing of the airbag cushion part may include compressing the top of the airbag cushion part through a disk-shaped compression jig.

The folding jig may include: a plurality of first folding jigs arranged in a radial shape around the circumference of the airbag cushion part; and a plurality of second folding jigs disposed between the first folding jigs, respectively.

The folding of the airbag cushion part may include folding the airbag cushion part while moving the plurality of first folding jigs toward the inflator connection part.

The folding of the airbag cushion part may further include folding the airbag cushion part while moving the plurality of second folding jigs between the first folding jigs, respectively.

Each of the first folding jigs may include a first jig head having an end portion cut in a wedge shape.

Each of the second folding jigs may include a second jig head formed in a plate shape so as to be inserted between the first jig heads.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
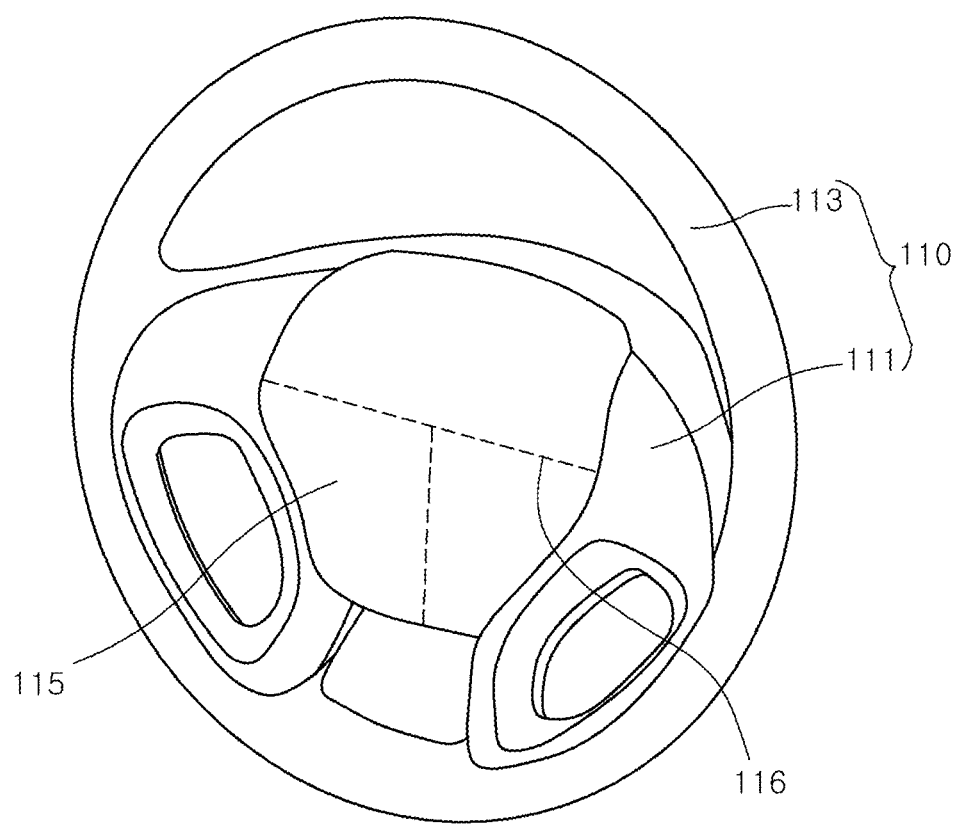
FIG. 1 illustrates a steering wheel in which a driver airbag in accordance with an embodiment of the present invention is installed.
Figure 2A:
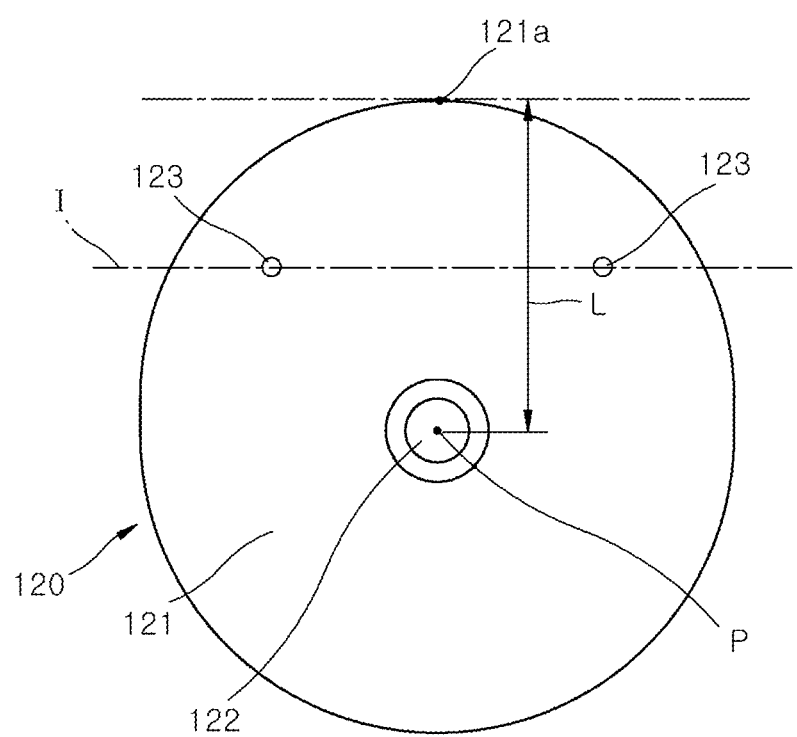
FIG. 2A is a front view illustrating that the driver airbag in accordance with the embodiment of the present invention is unfolded.
Figure 2B:
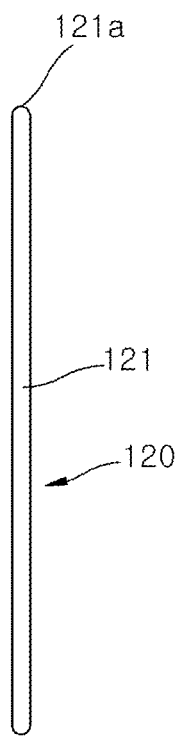
FIG. 2B is a side view of FIG. 2A.

FIG. 1 illustrates a steering wheel in which a driver airbag in accordance with an embodiment of the present invention is installed. FIG. 2A is a front view illustrating that the driver airbag in accordance with the embodiment of the present invention is unfolded, and FIG. 2B is a side view of FIG. 2A.

Figure 3A:
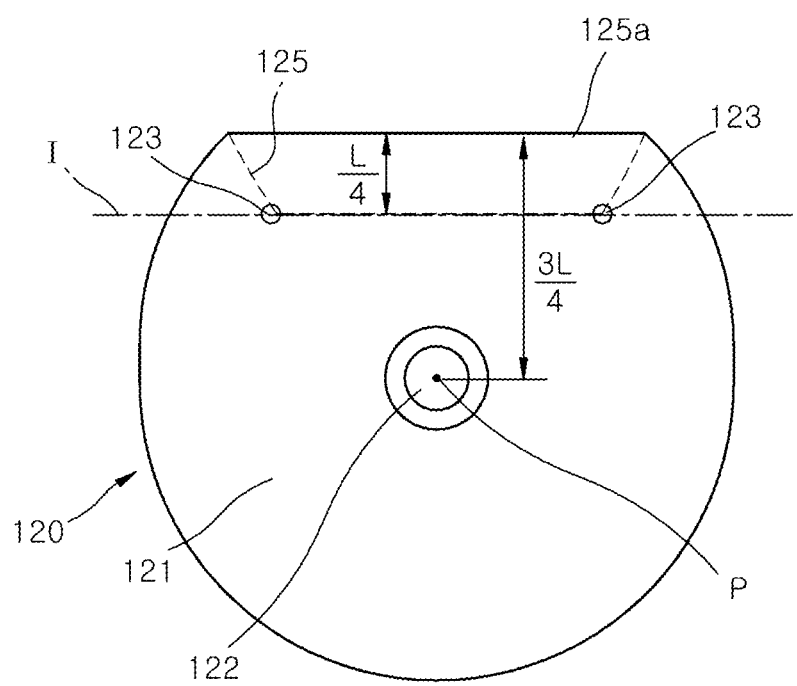
FIG. 3A is a front view illustrating that a tuck-in folding part is formed at the top of the driver airbag in accordance with the embodiment of the present invention.
Figure 3B:
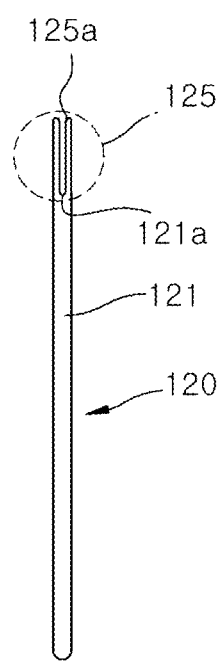
FIG. 3B is a side view of FIG. 3A.
Figure 4A:
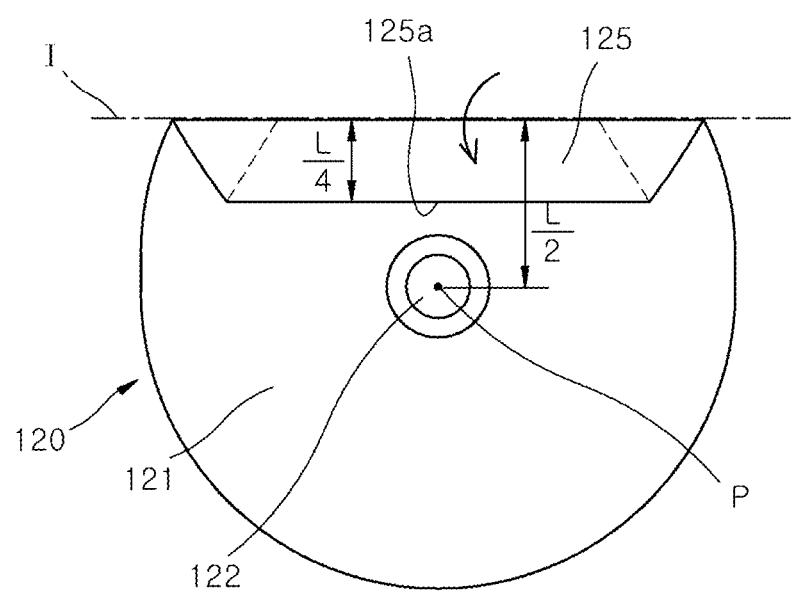
FIG. 4A is a front view illustrating that the tuck-in folding part of the driver airbag in accordance with the embodiment of the present invention is folded toward the opposite side with respect to a driver seat.
Figure 4B:
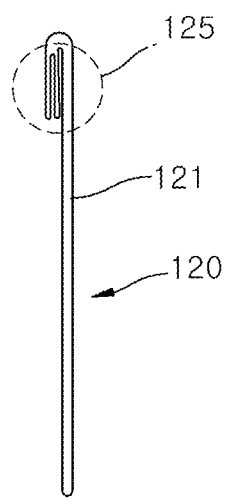
FIG. 4B is a side view of FIG. 4A.
Figure 5A:
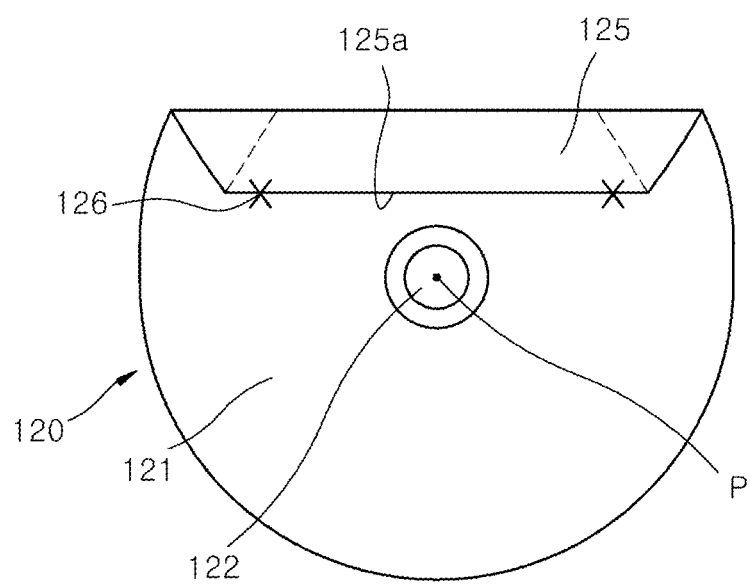
FIG. 5A is a front view illustrating that the tuck-in folding part of the driver airbag in accordance with the embodiment of the present invention is sewed to the driver airbag.
Figure 5B:
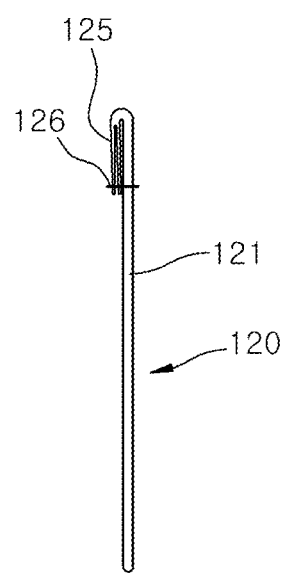
FIG. 5B is a side view of FIG. 5A.

FIG. 3A is a front view illustrating that a tuck-in folding part is formed at the top of the driver airbag in accordance with the embodiment of the present invention, and FIG. 3B is a side view of FIG. 3A. FIG. 4A is a front view illustrating that the tuck-in folding part of the driver airbag in accordance with the embodiment of the present invention is folded toward the opposite side with respect to a driver seat, and FIG. 4B is a side view of FIG. 4A. FIG. 5A is a front view illustrating that the tuck-in folding part of the driver airbag in accordance with the embodiment of the present invention is sewed to the driver airbag, and FIG. 5B is a side view of FIG. 5A.

Figure 6:
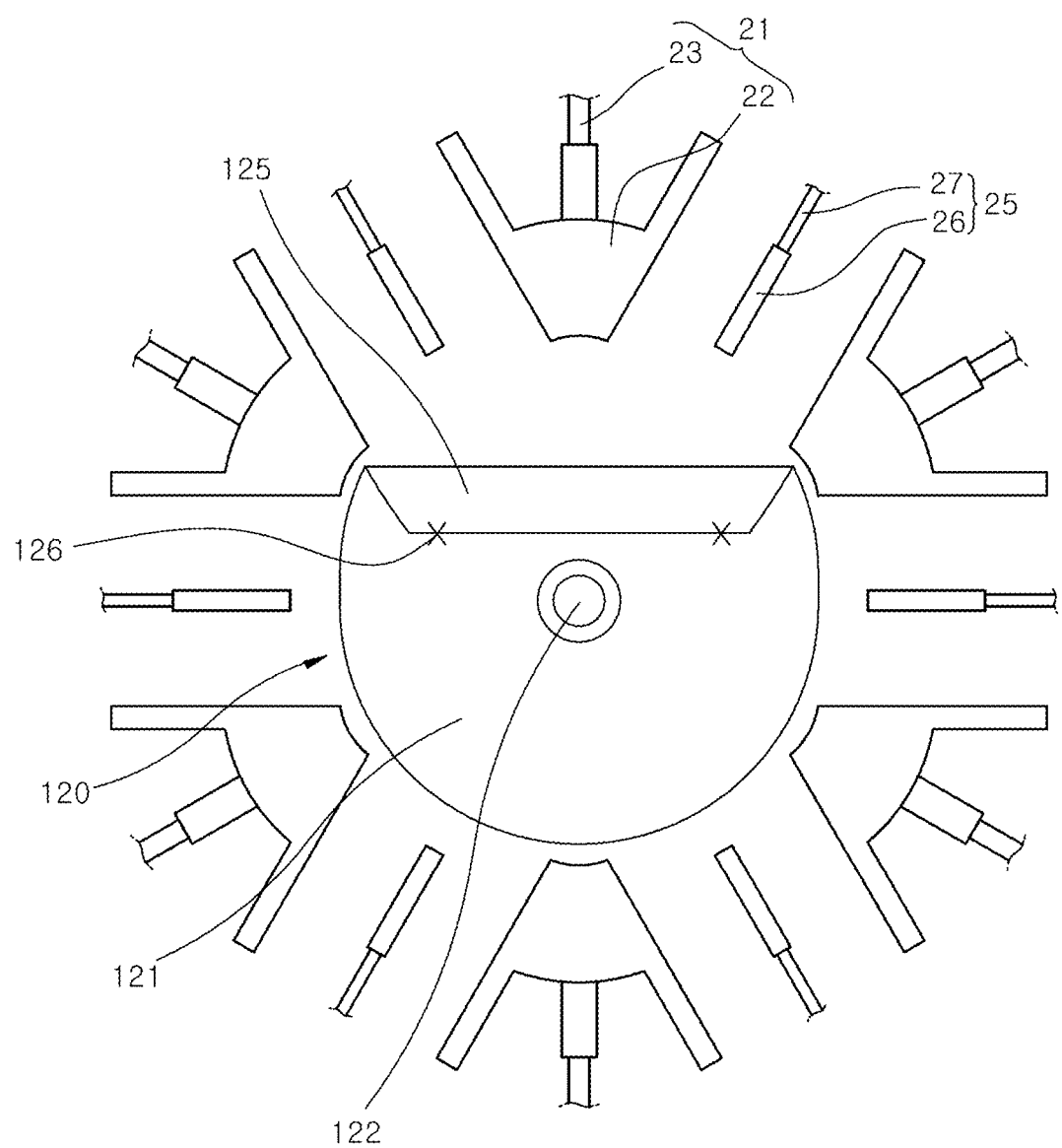
FIG. 6 illustrates that first and second folding jigs are arranged in the circumferential direction around the circumference of the driver airbag in accordance with the embodiment of the present invention.
Figure 7:
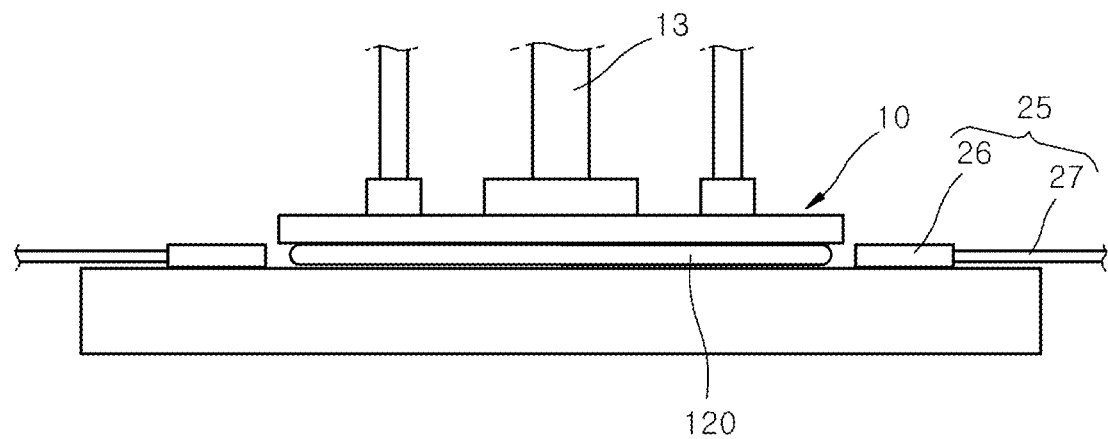
FIG. 7 illustrates that the driver airbag in accordance with the embodiment of the present invention is compressed by a compression jig.
Figure 8:
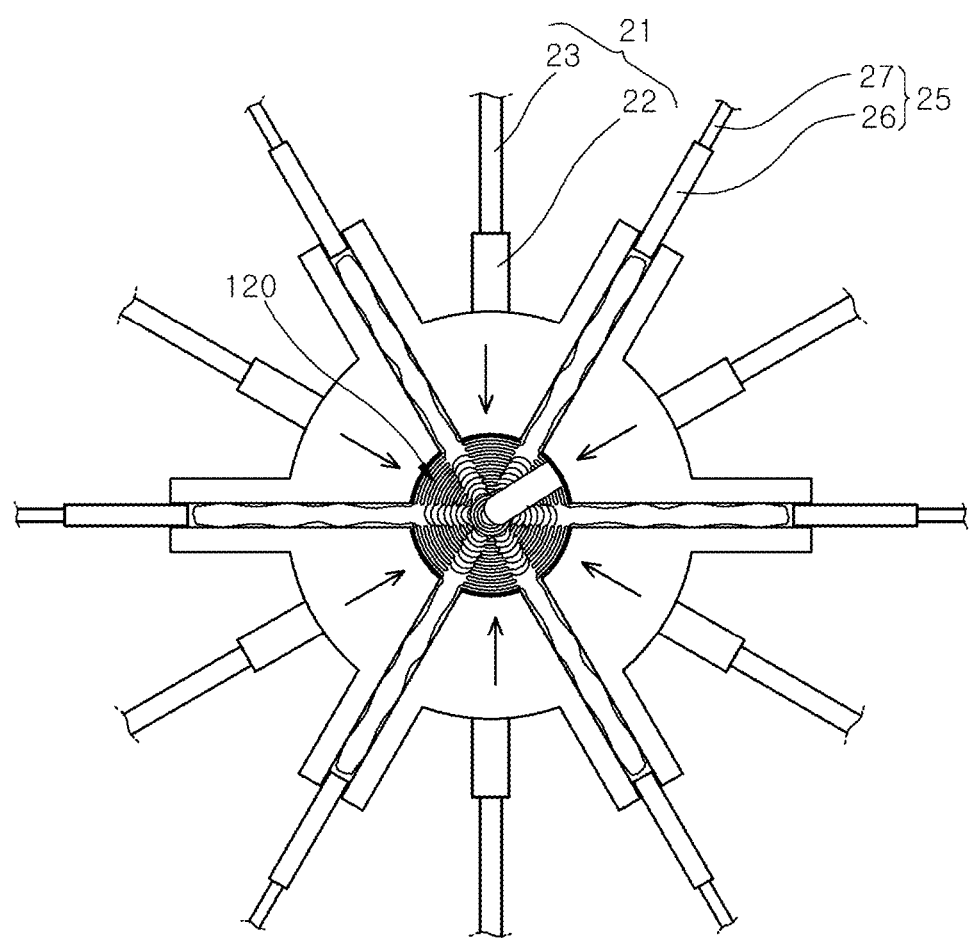
FIG. 8 illustrates that the driver airbag is folded by the first folding jigs arranged on the circumference of the driver airbag in accordance with the embodiment of the present invention.
Figure 9:
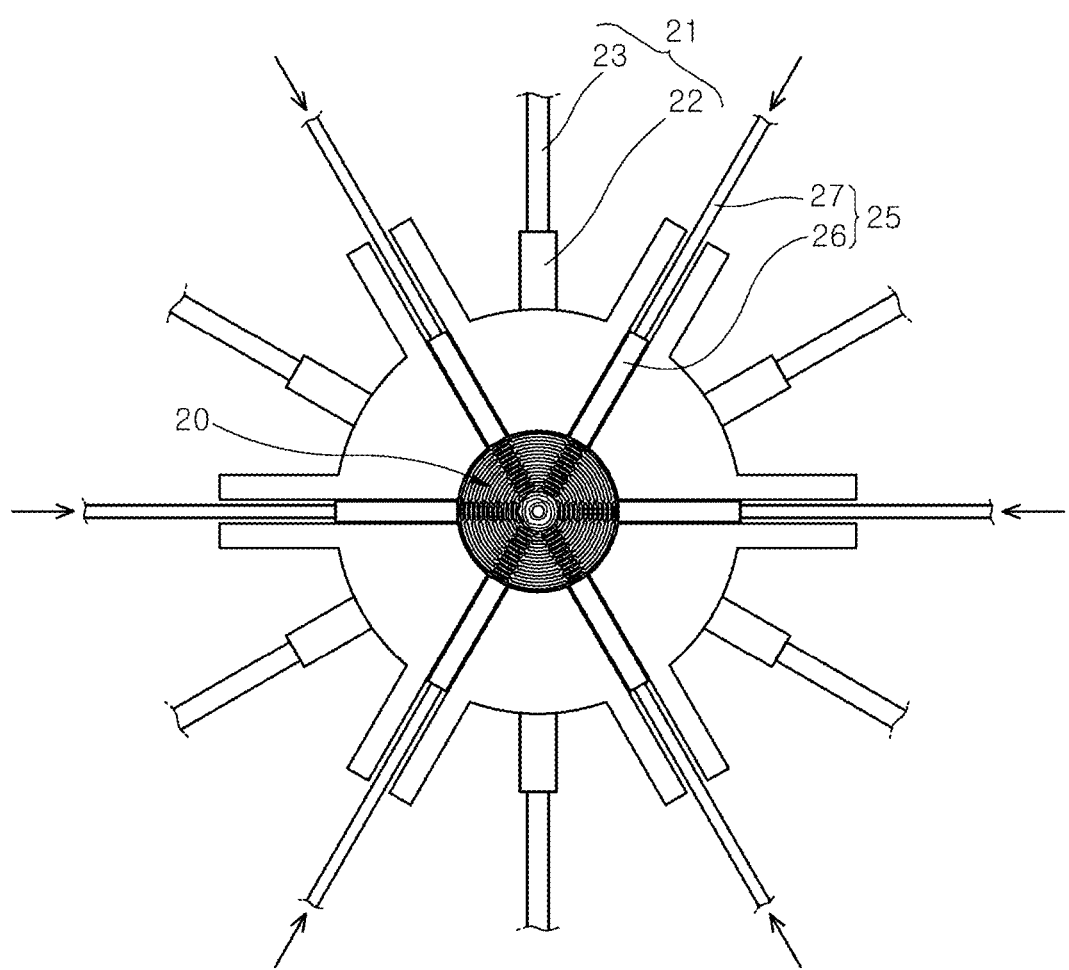
FIG. 9 illustrates that the driver airbag is folded by the second folding jigs arranged on the circumference of the driver airbag in accordance with the embodiment of the present invention.
Figure 10:
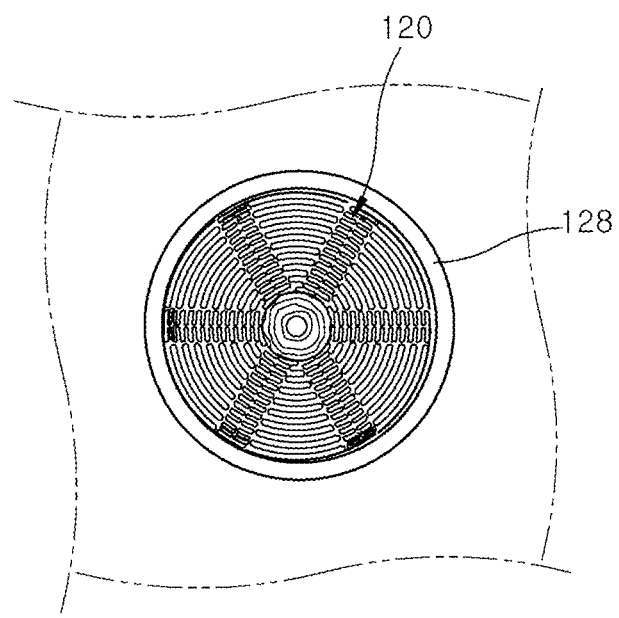
FIG. 10 illustrates that the driver airbag in accordance with the embodiment of the present invention is folded and then packaged in a housing.

FIG. 6 illustrates that first and second folding jigs are arranged in the circumferential direction around the circumference of the driver airbag in accordance with the embodiment of the present invention. FIG. 7 illustrates that the driver airbag in accordance with the embodiment of the present invention is compressed by a compression jig. FIG. 8 illustrates that the driver airbag is folded by the first folding jigs arranged on the circumference of the driver airbag in accordance with the embodiment of the present invention. FIG. 9 illustrates that the driver airbag is folded by the second folding jigs arranged on the circumference of the driver airbag in accordance with the embodiment of the present invention. FIG. 10 illustrates that the driver airbag in accordance with the embodiment of the present invention is folded and then packaged in a housing.

Figure 11:
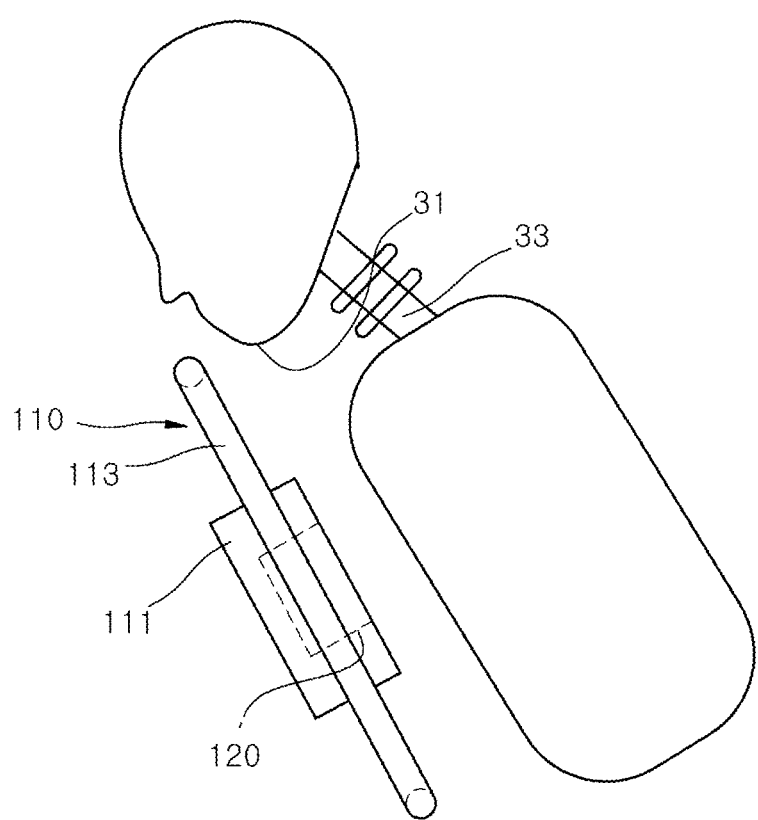
FIG. 11 illustrates that the driver airbag in accordance with the embodiment of the present invention is installed in the steering wheel.
Figure 12:
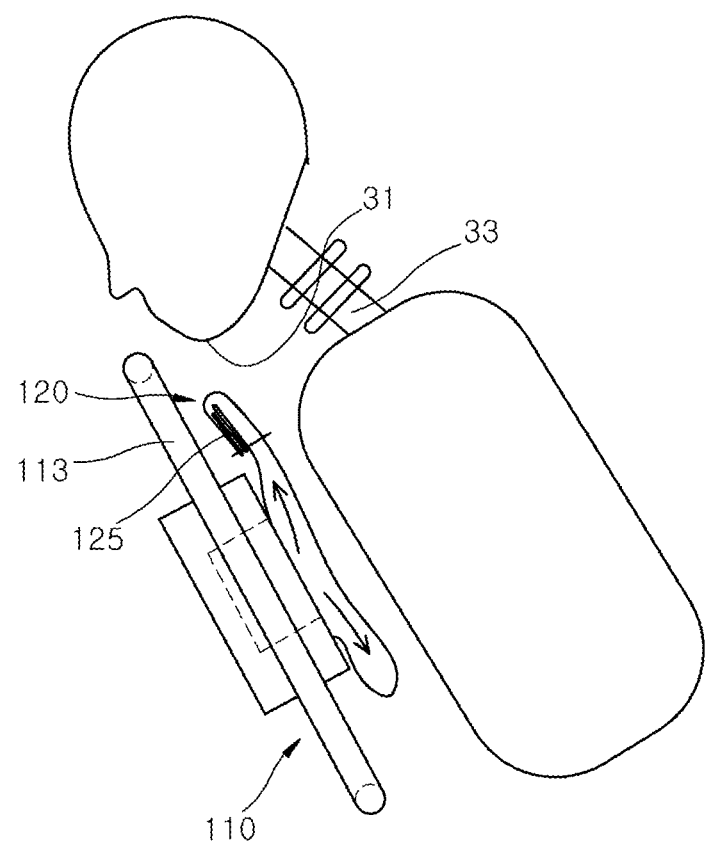
FIG. 12 illustrates that the driver airbag in accordance with the embodiment of the present invention is expanded from the steering wheel.
Figure 13:
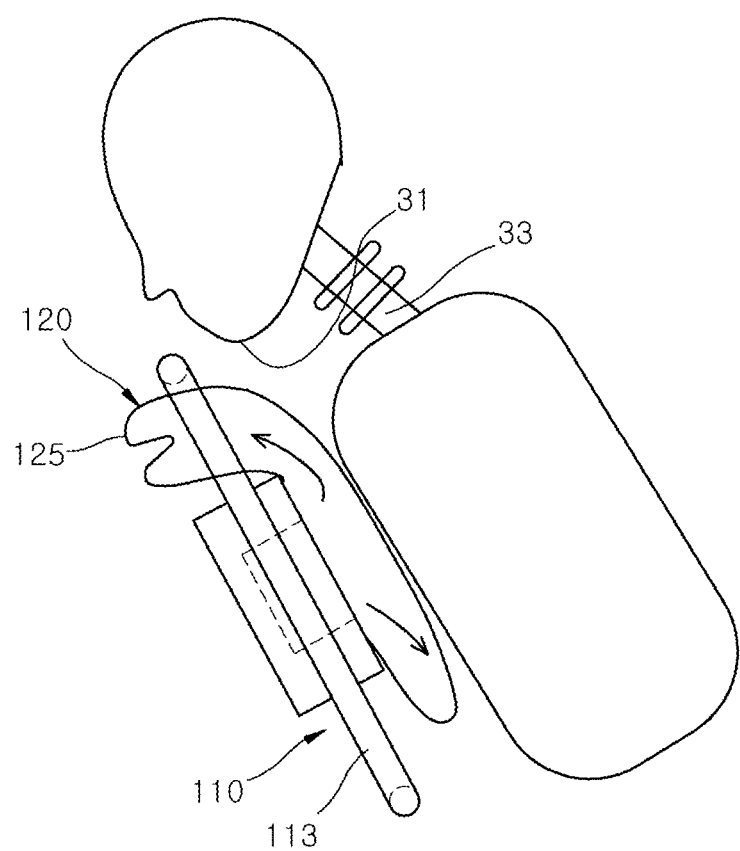
FIG. 13 illustrates that a temporarily sewed portion is torn and the tuck-in folding part is expanded, while the driver airbag in accordance with the embodiment of the present invention is expanded.
Figure 14:
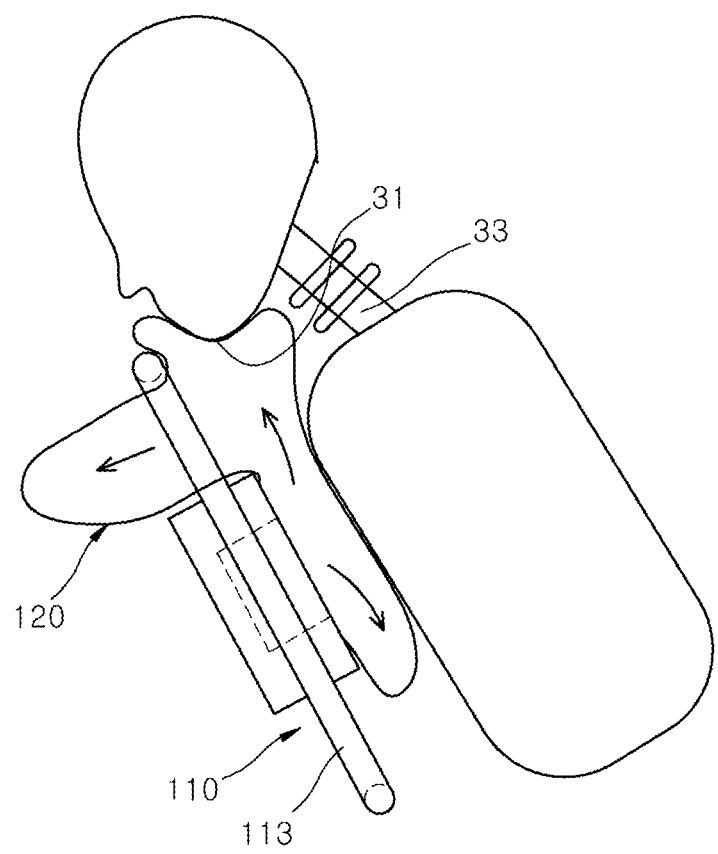
FIG. 14 illustrates that the tuck-in folding part of the driver airbag in accordance with the embodiment of the present invention is expanded toward the opposite side with respect to the driver seat through a space between a wheel body part and a rim part.
Figure 15:
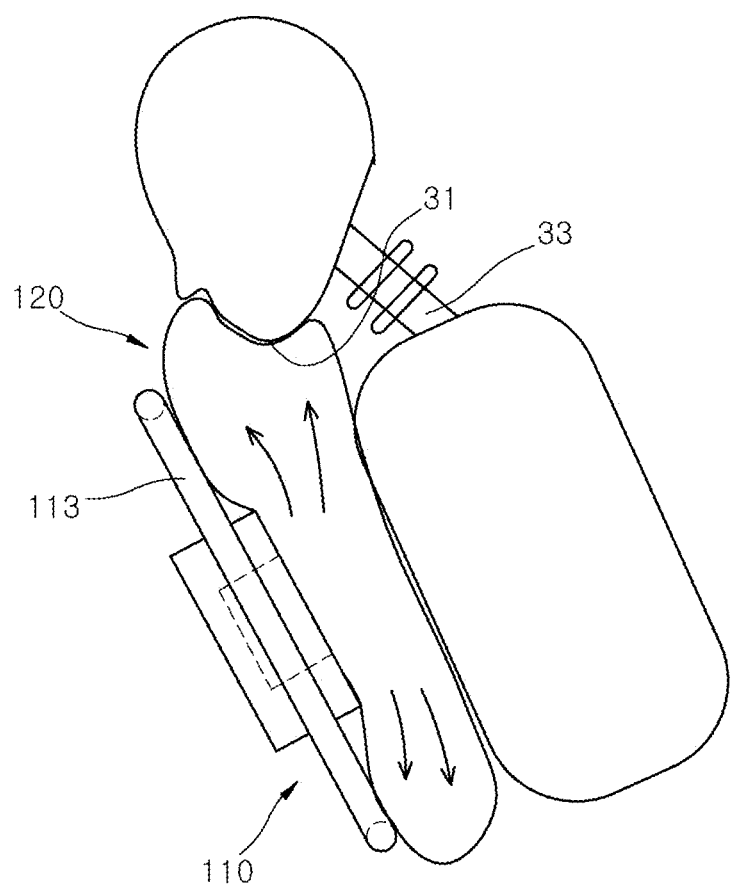
FIG. 15 illustrates that the driver airbag in accordance with the embodiment of the present invention is completely expanded.

FIG. 11 illustrates that the driver airbag in accordance with the embodiment of the present invention is installed in the steering wheel. FIG. 12 illustrates that the driver airbag in accordance with the embodiment of the present invention is expanded from the steering wheel. FIG. 13 illustrates that a temporarily sewed portion is torn and the tuck-in folding part is expanded, while the driver airbag in accordance with the embodiment of the present invention is expanded. FIG. 14 illustrates that the tuck-in folding part of the driver airbag in accordance with the embodiment of the present invention is expanded toward the opposite side with respect to the driver seat through a space between a wheel body part and a rim part. FIG. 15 illustrates that the driver airbag in accordance with the embodiment of the present invention is completely expanded.

Referring to FIGS. 1, 2, 10 and 11, a driver airbag 120 in accordance with an embodiment of the present invention may be packaged in a housing 128 and installed in a wheel body part 111 of a steering wheel 110. The wheel body part 111 may have a ring-shaped rim part 113 formed on the circumference thereof, and a space (not illustrated) may be formed between the wheel body part 111 and the rim part 113. The driver airbag 120 may be installed in the wheel body part 111, and shielded from outside by an airbag cover 115, and the airbag cover 115 may have a tear line 116 which is torn when the driver airbag 120 is expanded.

The driver airbag 120 may include an airbag cushion part 121 and an inflator connection part 122. The inflator connection part 122 may be formed in the center of the airbag cushion part 121, and an inflator (not illustrated) may be connected to the inflator connection part 122. The inflator may be installed in the wheel body part 111. The inflator connection part 122 may be disposed on the airbag cushion part 121 at the opposite side with respect to the driver seat.

The airbag cushion part 121 may have a plurality of vent holes 123 formed therein. When the airbag cushion part 121 is deployed, the plurality of vent holes 123 may be disposed above the inflator connection part 122. The plurality of vent holes 123 may be arranged in a row on a virtual line I. The virtual line I may be disposed at or around an middle point L/2 of a distance L between the center P of the inflator connection part 122 and an upper end portion 121a of the airbag cushion part 121, the upper end portion 121a being positioned at the maximum distance from the center P of the inflator connection part 122.

Hereafter, a method for folding the driver airbag having the above-described structure will be described as follows.

Referring to FIGS. 3 to 5, the upper end portion 121a of the airbag cushion part 121 may be pushed into the airbag cushion part 121 to form a tuck-in folding part 125. The tuck-in folding part 125 indicates a folding part formed in substantially an M-shape by pushing the upper end portion 121a of the airbag cushion part 121 into the airbag cushion part 121. Since the tuck-in folding part 125 is formed at the top of the airbag cushion part 121, the distance from the center of the inflator connection part 122 to the upper end 125a of the airbag cushion part 121 may be shortened.

At this time, the upper end portion 121a of the airbag cushion part 121 may be positioned on the virtual line I connecting the plurality of vent holes 123. Therefore, the distance between the upper end 125a of the tuck-in folding part 125 and the center P of the inflator connection part 122 may be decreased to approximately 3L/4. Since the virtual line I connecting the vent holes 123 serves as a reference line along which an operator folds the tuck-in folding part 125, the operator can fold the tuck-in folding part 125 according to the standards.

The tuck-in folding part 125 may be folded toward the opposite side with respect to the driver seat, that is, toward the inflator connection part 122. At this time, the upper end 125a of the tuck-in folding part 125 is separated from the inflator connection part 122. Furthermore, since the tuck-in folding part 125 has a widthwise length of L/4, interference between the tuck-in folding part 125 and the inflator connection part 122 can be prevented even though the tuck-in folding part 125 is folded. Since the inflator connection part 122 does not interfere with the tuck-in folding part 125 when the tuck-in folding part 125 is folded, it is possible to prevent the tuck-in folding part 125 from infringing on the inflator connection part 122, even though the tuck-in folding part 125 is folded toward the opposite side with respect to the driver seat (toward the inflator connection part 122).

Furthermore, since the tuck-in folding part 125 is folded toward the opposite side with respect to the driver seat, the tuck-in folding part 125 may be slightly released and positioned in the space between the wheel body part 111 and the rim part 113 at the initial stage of the deployment of the airbag cushion part 121. When the airbag cushion part 121 is deployed a little more, the temporarily sewed part 126 may be torn. Then, the tuck-in folding part 125 may be turned upward and introduced between the wheel body part 111 and the rim part 113. Furthermore, the tuck-in folding part 125 may be expanded and deployed toward the opposite side with respect to the driver seat.

Then, when the airbag cushion part 121 is further deployed, the upper end portion 121a of the airbag cushion part 121 may escape from the space between the wheel body part 111 and the rim part 113, and move between the rim part 113 and the face of the driver. At this time, since the upper end portion 121a of the airbag cushion part 121 is pressurized by the rim part 113 while escaping from the space between the wheel body part 111 and the rim part 113, the upper end portion 121a of the airbag cushion part 121 may be distributed and expanded to the space between the rim part 113 and the face and the space between the rim part 113 and the neck 33. Therefore, the upper end portion 121a of the airbag cushion part 121 can be prevented from being stuck between the jaw 31 and the neck 33 of the driver, and a turn of the upper end portion 121a of the airbag cushion part 121 can be prevented so as not to push the jaw 31 upward. Therefore, when the airbag cushion part 121 is deployed, an injury of the neck 33 can be prevented.

The contact pattern between the airbag cushion part 121 and the driver may cause a reaction force of the airbag cushion part 121 to push the head as a whole, regardless of bending of the driver's neck. Therefore, it is possible to secure the protection performance quality of the driver airbag 100 which is considerably resistant to variability in energy generated by the inflator (variability in gas pressure).

The tuck-in folding part 125 may be temporarily attached to the airbag cushion part 121. At this time, the upper end 125a of the tuck-in folding part 125 may be sewed to the airbag cushion part 121, in order to form the temporarily sewed part 126. Since the temporarily sewed part 126 is temporarily formed on the airbag cushion part 121, the tuck-in folding part 125 can be prevented from being released when the airbag cushion part 121 is folded by a folding jig 20. At this time, fabric having low seam strength may be applied to the tuck-in folding part 125 so as to be cut when the airbag cushion part 121 is deployed. Furthermore, the fabric strength of the temporarily sewed part 126 may be set to such a level that the temporarily sewed part 126 only prevents the tuck-in and bending structure from being released during the folding process of the airbag cushion part 121, and has no influence on the deployment of the airbag cushion part 121.

Referring to FIGS. 6 to 10, the airbag cushion part 121 is unfolded on the floor with the tuck-in folding part 125 folded toward the inflator connection part 122, and a gas injection part 13 of a compression jig 10 is connected to the inflator connection part 122.

Then, gas is injected into the airbag cushion part 121, and the top of the airbag cushion part 121 is compressed by the compression jig 10 such that the airbag cushion part 121 maintains a plate shape. The compression jig 10 is formed in a disk shape so as to come in contact with the entire airbag cushion part 121. The gas injection part 13 is connected to the compression jig 10. At this time, only a small amount of gas is injected into the airbag cushion part 121 such that the airbag cushion part 121 is expanded in a plate shape.

The airbag cushion part 121 is folded while the folding jig 20 disposed in a radial shape around the circumference of the airbag cushion part 121 is moved toward the inflator connection part 122. At this time, the gas may be discharged from the airbag cushion part 121 through the inflator connection part 122.

The folding jig 20 may include first and second folding jigs 21 and 25. At this time, the first folding jigs 21 may be radially arranged around the circumference of the airbag cushion part 121, and the second folding jigs 25 are disposed between the first folding jigs 21, respectively. The first and second folding jigs 21 and 25 are alternately installed at the circumference of the airbag cushion part 121.

The first folding jig 21 may include a first jig head 22 and a first jig rod 23. The first jig head 22 has an end portion cut in a wedge shape to push and move the airbag cushion part 121 toward the inflator connection part 122, and the first jig rod 23 is connected to the first jig head 22. The second folding jig 25 may include a second jig head 26 and a second jig rod 27. The second jig head 26 is formed in a plate shape so as to be inserted between the first jig heads 22, and the second jig rod 27 is connected to the second jig head 26.

While the plurality of first folding jigs 21 are moved toward the inflator connection part 122, the airbag cushion part 121 is folded. At this time, when the first folding jigs 21 are moved toward the inflator connection part 122, a portion of the airbag cushion part 121, which is not pushed and moved toward the inflator connection part 122, may be held between the first folding jigs 21. The gas of the airbag cushion part 121 may be discharged through the inflator connection part 122.

The airbag cushion part 121 may be folded while the plurality of second folding jigs 25 arranged between the respective first folding jigs 21 are moved between the first folding jigs 21. At this time, since the airbag cushion part 121 positioned between the first folding jigs 21 is moved toward the inflator connection part 122 by the first folding jigs 21, the airbag cushion part 121 may be folded in a circular shape around the circumference of the inflator connection part 122. The gas of the airbag cushion part 121 may be discharged through the inflator connection part 122.

The airbag cushion part 121 folded by the first and second folding jigs 21 and 25 may be housed in the housing 128 and then installed in the wheel body part 111 of the steering wheel 110.

Hereafter, a process of deploying the driver airbag folded in the above-described manner will be described as follows.

Referring to FIGS. 11 to 15, gas generated by the inflator may be injected into the airbag cushion part 121 through the inflator connection part 122, in case of a vehicle collision. As the gas is injected into the airbag cushion part 121, the airbag cushion part 121 packaged in the housing 128 may pop up toward the driver seat while tearing the airbag cover 115.

When the airbag cushion part 121 is deployed, most of the airbag cushion part 121 may be flatly expanded between the steering wheel 110 and the chest of the driver. At this time, the airbag cushion part 121 may be radially unfolded and expanded.

As the airbag cushion part 121 is radially expanded, the tuck-in folding part 125 may be moved to the space between the wheel body part 111 and the rim part 113, and the temporarily sewed part 126 is cut by the expansion pressure of the airbag cushion part 121.

At this time, since the tuck-in folding part 125 is folded toward the opposite side with respect to the driver seat, the tuck-in folding part 125 is released and expanded at the opposite side with respect to the driver seat (toward the inflator connection part 122) while passing through the space between the wheel body part 111 and the rim part 113. Since the tuck-in folding part 125 is expanded to the opposite side with respect to the driver seat at the initial stage of the deployment of the airbag cushion part 121, the upper end portion 121*a* of the airbag cushion part 121 may be prevented from moving between the neck 33 and the jaw 31 of the driver.

Then, when the airbag cushion part 121 is further deployed, the upper end portion 121*a* of the airbag cushion part 121 may escape from the space between the wheel body part 111 and the rim part 113, and move between the rim part 113 and the face of the driver. At this time, since the upper end portion 121*a* of the airbag cushion part 121 is pressurized by the rim part 113 while escaping from the space between the wheel body part 111 and the rim part 113, the upper end portion 121*a* of the airbag cushion part 121 may be distributed and expanded to the space between the rim part 113 and the face and the space between the rim part 113 and the neck 33. Therefore, the upper end portion 121*a* of the airbag cushion part 121 may be prevented from pushing the jaw 31 upward while being further expanded after being stuck between the jaw 31 and the neck 33. Therefore, when the airbag cushion part 121 is deployed, an injury of the neck 33 can be prevented.

When the airbag cushion part 121 is completely expanded, the upper end portion 121*a* of the airbag cushion part 121 may be tightened. Therefore, the upper end portion 121*a* of the airbag cushion part 121 may be positioned between the rim part 113 and the face of the driver.

As described above, the tuck-in folding part 125 formed at the top of the airbag cushion part 121 may be folded toward the opposite side with respect to the driver seat, which makes it possible to prevent the upper portion of the airbag cushion part 121 from being stuck between the neck 33 and the jaw 31 when the airbag cushion part 121 is deployed. A test result shows that an injury of the neck 33 can be reduced to 45 to 48% from 97% in the related art.

In accordance with the embodiment of the present invention, since the tuck-in folding part is folded toward the opposite side with respect to the driver seat, the tuck-in folding part may be expanded to the opposite side with respect to the driver seat, while passing through the space between the wheel body part and the rim part. Therefore, it is possible to prevent the upper end portion of the airbag cushion part from being stuck between the jaw and neck of the driver, while preventing a turn of the airbag cushion part so as not to push the jaw upward.

Furthermore, the contact pattern between the airbag cushion part and the driver may cause a reaction force of the airbag cushion part to push the head as a whole, regardless of bending of the driver's neck. Therefore, it is possible to secure the protection performance quality of the driver airbag which is considerably resistant to variability in energy generated by the inflator (variability in gas pressure).

Moreover, since the tuck-in folding part is formed at the top of the airbag cushion part, the distance between the top of the airbag cushion part and the center of the inflator connection part may be reduced. Therefore, although the tuck-in folding part is folded toward the opposite side with respect to the driver seat, interference between the tuck-in folding part and the inflator connection part can be prevented.

Furthermore, since the temporarily sewed portion is formed on the airbag cushion part, it is possible to prevent the tuck-in folding part from being released when the airbag cushion part is folded by the folding jig.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for folding a driver airbag, comprising:
   forming a tuck-in folding part by pushing an upper end portion of an airbag cushion part into the airbag cushion part;
   folding the tuck-in folding part toward the opposite side with respect to a driver seat;
   temporarily attaching the tuck-in folding part to the airbag cushion part;
   injecting gas into the airbag cushion part, and compressing the airbag cushion part such that the airbag cushion part maintains a plate shape; and
   folding the airbag cushion part while moving a folding jig disposed in a radial shape around the circumference of the airbag cushion part toward an inflator connection part.

2. The method of claim 1, wherein in the forming of the tuck-in folding part, the upper end portion of the airbag cushion part is positioned on a virtual line connecting a plurality of vent holes.

3. The method of claim 1, wherein in the folding of the tuck-in folding part toward the opposite side with respect to the driver seat, an end portion of the folded tuck-in folding part is separated from the inflator connection part.

4. The method of claim 1, wherein the temporarily attaching of the tuck-in folding part to the airbag cushion part comprises forming a temporarily sewed part by sewing the tuck-in folding part to the airbag cushion part.

5. The method of claim 1, wherein the injecting of the gas into the airbag cushion part and the compressing of the airbag cushion part comprises compressing the top of the airbag cushion part through a disk-shaped compression jig.

6. The method of claim 1, wherein the folding jig comprises:
   a plurality of first folding jigs arranged in a radial shape around the circumference of the airbag cushion part; and
   a plurality of second folding jigs disposed between the first folding jigs, respectively.

7. The method of claim 6, wherein the folding of the airbag cushion part comprises folding the airbag cushion part while moving the plurality of first folding jigs toward the inflator connection part.

8. The method of claim 7, wherein the folding of the airbag cushion part further comprises folding the airbag cushion part while moving the plurality of second folding jigs between the first folding jigs, respectively.

9. The method of claim 8, wherein each of the first folding jigs comprises a first jig head having an end portion cut in a wedge shape.

10. The method of claim 9, wherein each of the second folding jigs comprises a second jig head formed in a plate shape so as to be inserted between the first jig heads.

\* \* \* \* \*